(12) United States Patent
Ferri

(10) Patent No.: US 6,212,756 B1
(45) Date of Patent: Apr. 10, 2001

(54) DISPENSABLE NON-ADHESIVE DESICCATED MATRIX SYSTEM FOR INSULATING GLASS UNITS

(75) Inventor: Louis Anthony Ferri, Solon, OH (US)

(73) Assignee: TruSeal Technologies, Inc., Beachwood, OH (US)

( * ) Notice: Subject to any disclaimer, the term of this patent is extended or adjusted under 35 U.S.C. 154(b) by 0 days.

(21) Appl. No.: 09/235,069

(22) Filed: Jan. 21, 1999

Related U.S. Application Data

(60) Provisional application No. 60/096,490, filed on Aug. 14, 1998.

(51) Int. Cl.[7] .............................. B21B 1/46; B21B 13/22; E06B 3/24
(52) U.S. Cl. .................................... 29/527.1; 29/897.312; 428/34
(58) Field of Search .............................. 29/469.5, 527.1, 29/897.312; 264/331.11; 428/34

(56) References Cited

U.S. PATENT DOCUMENTS

| | | |
|---|---|---|
| 2,964,809 | 12/1960 | Gwyn et al. . |
| 3,758,996 | 9/1973 | Bowser . |
| 3,928,953 * | 12/1975 | Mazzoni et al. . |
| 3,998,680 | 12/1976 | Flint . |
| 4,080,482 * | 3/1978 | Lacombe .............................. 428/34 |
| 4,186,685 | 2/1980 | Chenel et al. . |
| 4,198,254 * | 4/1980 | Laroche et al. ........................ 428/34 |
| 4,250,081 | 2/1981 | Bode et al. . |
| 4,431,691 | 2/1984 | Greenlee . |
| 4,485,204 | 11/1984 | Nabors . |
| 4,622,249 | 11/1986 | Bowser . |
| 4,698,891 * | 10/1987 | Borys . |
| 4,745,711 | 5/1988 | Box . |
| 4,814,215 | 3/1989 | Lautenschlaeger et al. . |
| 4,835,130 | 5/1989 | Box . |
| 4,950,344 | 8/1990 | Glover et al. . |
| 5,094,055 | 3/1992 | Berdan . |
| 5,177,916 | 1/1993 | Misera et al. . |

(List continued on next page.)

FOREIGN PATENT DOCUMENTS

| | | |
|---|---|---|
| 1 008 970 A3 | 10/1996 | (BE) . |
| 652 324 A5 | 11/1985 | (CH) . |
| 2379691 | 9/1978 | (FR) . |

OTHER PUBLICATIONS

International Search Report dated Dec. 22, 1999.
Desi–Rope® advertisement ©1998 Edgetech I.G.

*Primary Examiner*—I. Cuda Rosenbaum
*Assistant Examiner*—Eric Compton
(74) *Attorney, Agent, or Firm*—Renner, Otto, Boisselle & Sklar, LLP

(57) ABSTRACT

The present invention includes a method of making an edge assembly for an insulating glass unit, the edge assembly including a closed hollow spacer, the method comprising (1) dispensing a flowable desiccating matrix formulation onto a portion of the spacer which will be inside the hollow spacer when the spacer has been closed; (2) allowing or causing the formulation to solidify into a solid matrix and to detach from any attachment to the spacer; and (3) closing the spacer whereby the detached matrix will be retained within the spacer. The present invention includes a thermoplastic desiccating matrix formulation comprising about 80 to about 30 weight % of the formulation of a thermoplastic material; and about 20 to about 70 weight % of the formulation of an adsorbent component, wherein the adsorbent component includes a moisture adsorbing material and a volatile organic chemical adsorbing material, of which 0–50 weight % of the adsorbent component is the adsorbent of volatile organic compounds; wherein the formulation, when dispensed as a liquid onto an inner surface of an edge assembly and allowed to cool to ambient temperature, forms a solid matrix having an outer surface which does not adhere to the inner surface of the edge assembly.

37 Claims, 2 Drawing Sheets

U.S. PATENT DOCUMENTS

| | | |
|---|---|---|
| 5,209,034 | 5/1993 | Box et al. . |
| 5,332,538 | 7/1994 | Levinson et al. . |
| 5,432,214 | 7/1995 | Lancesseur . |
| 5,436,040 | 7/1995 | Lafond . |
| 5,439,716 * | 8/1995 | Larsen ................................ 428/34 |
| 5,441,779 | 8/1995 | Lafond . |
| 5,503,884 | 4/1996 | Meyer et al. . |
| 5,509,984 | 4/1996 | Meyer et al. . |
| 5,510,416 | 4/1996 | Meyer et al. . |
| 5,632,122 | 5/1997 | Spinks . |

\* cited by examiner

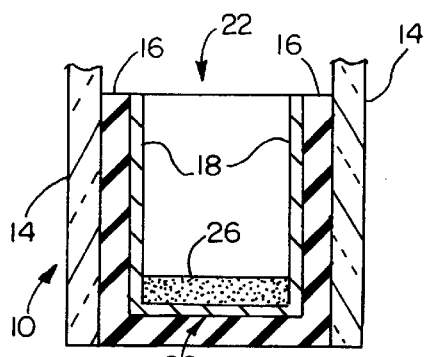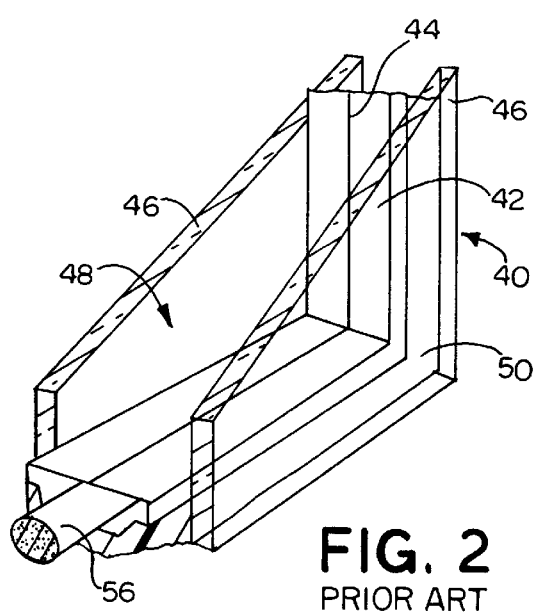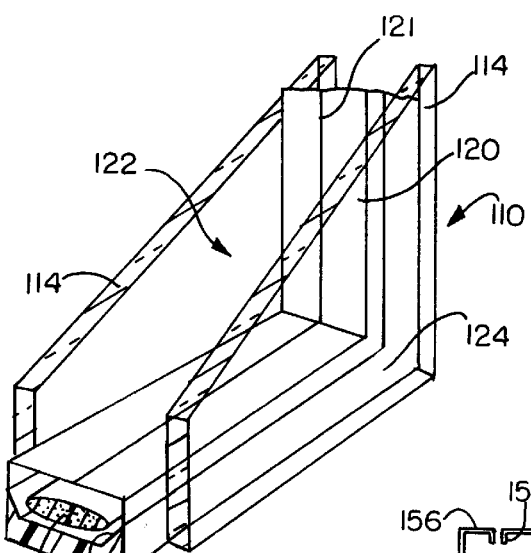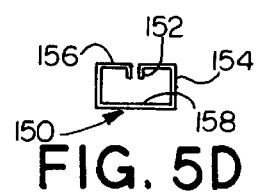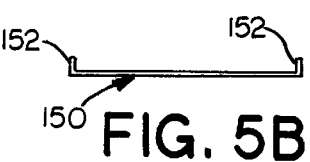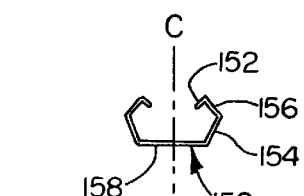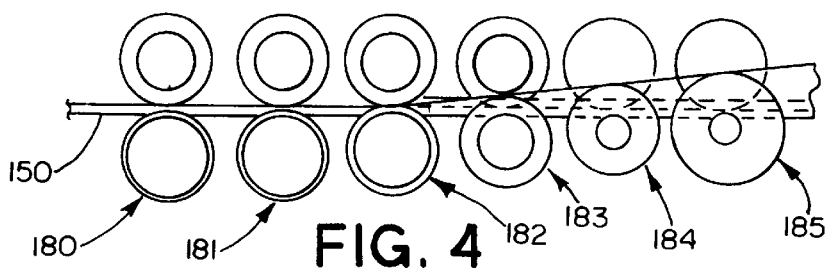

DISPENSABLE NON-ADHESIVE DESICCATED MATRIX SYSTEM FOR INSULATING GLASS UNITS

CROSS-REFERENCE TO RELATED APPLICATIONS

This application claims the benefit of U.S. Provisional Application Ser. No. 60/096,490, filed Aug. 14, 1998.

FIELD OF THE INVENTION

The present invention relates to a desiccating matrix and a method for applying the desiccating matrix in manufacturing insulating glass units. More particularly, the invention provides a non-adhering desiccating matrix for use with the insulating glass units, and includes a method of applying such non-adhering desiccating matrix to a spacer for an edge assembly of an insulating glass unit.

BACKGROUND OF THE INVENTION

Insulating glass units ("IGUs"), made with at least two glass panels arranged in spaced-apart relationship with an edge assembly to form an enclosed interior space, require the presence of a desiccant in the interior space to avoid condensation of moisture or other volatile materials due to the temperature difference between the inner and outer glass panels. Such condensation is generally referred to as "fogging" of the IGU. Moisture or materials such as volatile organic chemicals ("VOCs") may remain in the interior space after manufacture or may seep into the interior space during post-manufacture use. The moisture and VOCs may cause fogging in the interior space. The desiccant is provided to remove the moisture and/or VOCs from the interior space by adsorption. As used hereinafter, the terms "desiccating materials" and "desiccants" include adsorbents of both moisture and VOCs, except where specific adsorbents of moisture or VOCs are separately identified and limited as to specific materials adsorbed.

In early IGUs, loose particles of desiccating materials in a container were placed in the interior space of the IGU, free of any matrix for holding together the desiccant particles. This resulted in problems such as spillage of the desiccating material from the spacer, bead migration and dusting, too-rapid adsorption of moisture resulting in premature saturation of the desiccant prior to assembly of the IGU and reduced life expectancy or premature failure of the IGU, and included problems in manufacture due to the size and nature of the particles of desiccant materials. An early example of such units may be found, for example, in U.S. Pat. No. 2,964,809. Similarly, in later IGUs, the loose desiccant material was disposed in the body of the spacer itself, such as is shown in U.S. Pat. No. 3,998,680.

Later IGUs were provided with a desiccant dispersed within a thermoplastic carrier, in which the thermoplastic was placed in the interior space, as shown, for example in U.S. Pat. No. 3,758,996. In an effort to simplify construction of the IGU, dimensionally stable sealant and spacer strips were developed. Such strips include an elongated ribbon of deformable sealant having an imbedded spacer means such as a corrugated metal strip. On the inner side of this strip is disposed a decorative facing which has impregnated therein a desiccant. Such a system is sold as SWIGGLE® Seal, and is disclosed in U.S. Pat. No. 4,431,691. Other IGUs include a spacer made of silicone or acrylic foam containing large quantities of a desiccant fill material, such as is shown in U.S. Pat. No. 4,950,344. An IGU with a spacer filled with a desiccating matrix is disclosed in U.S. Pat. No. 5,209,034.

Among other developments in this area are insulating glass units such as those shown in U.S. Pat. No. 5,177,916 and the progeny thereof, in which a U-shaped spacer is placed between glass panels to form an interior space, and an adhesive containing a desiccant is coated on the inside of the U-shaped spacer. A drawback of using mastics in an IGU like that described in U.S. Pat. No. 5,177,916 arises from limitations imposed by the mastic. The material may soften such that it sags at the temperatures to which the IGU is exposed in use. The desiccating mastic may evolve an excessive amount of water or organic vapors, which can result in fogging. Thus, two-part, curing formulations have been avoided, since curing reactions may evolve volatile byproducts. The mastic should be UV stable, since it will be directly exposed to UV radiation throughout its useful life. U.S. Pat. No. 5,510,416 describes a particular hot melt thermoplastic mastic. The hot melt mastic of U.S. Pat. No. 5,510,416 forms a coating on the interior of the U-shaped spacer of the IGU, so as to be retained thereon, to avoid the problem of sagging and to prevent separation of the hot melt mastic from the spacer.

Another approach to providing desiccating materials in the interior space of IGUs is the DESI-ROPES® continuous desiccating cord. Such cord is provided in continuous, pre-extruded lengths, for insertion into the spacer during manufacture of the IGU. The DESI-ROPE® is believed to be a cured EPDM elastomeric material impregnated with a desiccant. This product avoids some of the problems associated with the thermoplastic compositions, but comes with its own set of drawbacks. Since the cord is pre-manufactured and contains desiccant, it must be handled and stored appropriately between the times of manufacture and use so as to avoid premature moisture adsorption and saturation. According to the manufacturer's information, reels of the DESI-ROPE® material are supplied in vacuum-sealed, moisture-proof foil bags which are in turn packaged in high density polyethylene bags, and shipped in cardboard boxes. As a result, packaging for protecting this product from inadvertent exposure to moisture is an important issue, resulting in additional costs and handling and storage precautions.

SUMMARY OF THE INVENTION

The present invention provides a method of applying a flowable, non-adhering desiccating matrix which overcomes the aforementioned problems of the prior art. The present invention also provides a flowable, non-adhering desiccating matrix formulation. The present invention further provides an efficient method for forming an insulating glass unit having a closed hollow spacer containing the thermoplastic desiccating matrix, in which method the matrix formulation may be pumped at or below the temperatures used for hot melt thermoplastics but does not adhere to the spacer when the molten desiccating matrix formulation solidifies. Thus, a preferred formulation is characterized by the combined features of being capable of being dispensed from, e.g., hot melt equipment and of being non-adhering. The feature of being dispensed by hot melt equipment allows the matrix to be used in existing hot melt equipment. In an alternative embodiment, one or two part curable desiccating mastic formulations may be used, provided such formulations do not result in an undue amount of evolved water or VOCs which could result in fogging. In such an alternative embodiment, the curable material may be pumped at room or ambient temperature. A two part formulation would be statically mixed at the point of application to the spacer. This alternative formulation, like the other formulations disclosed herein, preferably is non-adhering to the surfaces of the spacer when solidified.

The non-adhesion feature of the invention essentially allows the entire surface of the desiccating matrix to be exposed to the atmosphere in the interior space of the IGU. As a result of the increased surface area, the inventive thermoplastic desiccating matrix formulation features enhanced adsorption of moisture and volatile elements, thus contributing to a superior IGU which is easy to manufacture.

According to one aspect of the invention, a closed hollow spacer for an insulating glass unit, is made by (1) dispensing a flowable desiccating matrix formulation onto a portion of the spacer which will be inside the hollow spacer when the spacer has been closed; (2) allowing or causing the formulation to solidify into a solid matrix that will be detached from the spacer; and (3) closing the spacer whereby the detached solid matrix will be retained within the spacer.

According to another aspect of the invention, an insulating glass unit is made by assembling the closed spacer between two panes of glass. An adhesive material may be provided between the spacer and the panes of glass, and a sealing material may be provided between the spacer and/or the panes of glass.

In one embodiment, the invention provides a method of making a closed hollow spacer for an insulating glass unit, comprising (1) dispensing a flowable desiccating matrix formulation onto a portion of the spacer which will be inside the spacer when the spacer has been closed; (2) allowing or causing the formulation to solidify into a solid matrix and to detach from any attachment to the spacer; (3) closing the spacer whereby the detached matrix will be retained within the spacer.

In one embodiment, the invention provides a method of making an insulating glass unit including at least two glass panels and a hollow spacer having an interior wall and separating the glass panels to form an interior space of the IGU, the hollow spacer retaining therein a desiccating matrix, comprising: (1) heating a desiccating matrix formulation to a temperature at which it is flowable; (2) dispensing the heated formulation onto the interior wall of the hollow spacer; (3) allowing the formulation to solidify to form a solid matrix; and (4) freeing the matrix from any adhesion to the spacer. The matrix may be freed from adhesion to the spacer by cooling or other means, such as by mechanically dislodging the solid matrix from any adhesion to the spacer.

In one embodiment, the invention provides a method of making an insulating glass unit including at least two glass panels and a hollow spacer separating the glass panels, the panels and spacer forming an interior space of the IGU, the hollow spacer retaining therein a solid desiccating matrix, comprising: (1) heating a desiccating matrix formulation to a temperature at which it is flowable; (2) dispensing the heated formulation into the hollow spacer under conditions such that it forms a solid matrix which does not adhere to the spacer in use.

In one embodiment, the invention provides a thermoplastic desiccating matrix formulation including about 80 to about 30 weight % of the formulation of a thermoplastic material, wherein the thermoplastic material is selected from the group consisting of ethylene vinyl acetate copolymer, LLDPE, LDPE, styrenic thermoplastic elastomer, ethylene-methyl acrylate copolymer, and ethylene-acrylic acid copolymer; and about 20 to about 70 weight % of the formulation of an adsorbent component, wherein the adsorbent component includes a moisture adsorbing material and a volatile organic chemical adsorbing material, of which 0–50% of the adsorbent component is the adsorbent of volatile organic compounds.

In one embodiment, the invention provides a thermoplastic desiccating matrix formulation which, when dispensed as a flowable liquid onto an inner surface of an edge assembly and allowed to cool to ambient temperature, forms a solid matrix having an outer surface which does not adhere to the inner surface of the edge assembly.

In one embodiment, the invention provides a thermoplastic desiccating matrix formulation comprising about 50 weight % of the formulation of an ethylene vinyl acetate copolymer; and about 50 weight % of the formulation of an adsorbent component.

In one embodiment, the invention provides a desiccating matrix formulation consisting essentially of a combination of about 50 weight % of an ethylene vinyl acetate copolymer containing about 14 weight % of vinyl acetate, and about 50 weight % of the formulation of a mixture containing about 85 weight % of 3A molecular sieve and about 15 weight percent of 13X molecular sieve.

In one embodiment, the invention provides a desiccating matrix formulation comprising about 80 to about 30 weight % of the formulation of a curable material, wherein the curable material is selected from the group consisting of a one-part mixture comprising an isocyanate-terminated pre-polymer and dibutyl tin dilaurate; a two-part mixture in which a first part comprises an isocyanate-terminated pre-polymer and dibutyl tin laurate and a second part comprises an active hydrogen compound; and a two-part mixture in which a first part comprises diglycidyl ether bisphenol A and a second part comprises an epoxy curative; and about 20 to about 70 weight % of the formulation of an adsorbent component, wherein the adsorbent component includes a moisture adsorbing material and a volatile organic chemical adsorbing material, of which 0–50% of the adsorbent component is the adsorbent of volatile organic compounds.

The foregoing and other features of the invention are hereinafter more fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

FIG. 1 is a cross-sectional view of a prior art IGU.

FIG. 2 is a perspective, partial cut-away view of another prior art IGU.

FIG. 3 is a perspective, partial cut-away view of an IGU in accordance with the present invention.

FIG. 4 is a schematic side elevational view of a roll-forming apparatus.

FIGS. 5A–5D are sequential schematic cross-sectional views of a strip of spacer material at certain points during forming by the roll-forming apparatus of FIG. 4.

DETAILED DESCRIPTION

Figure 6:
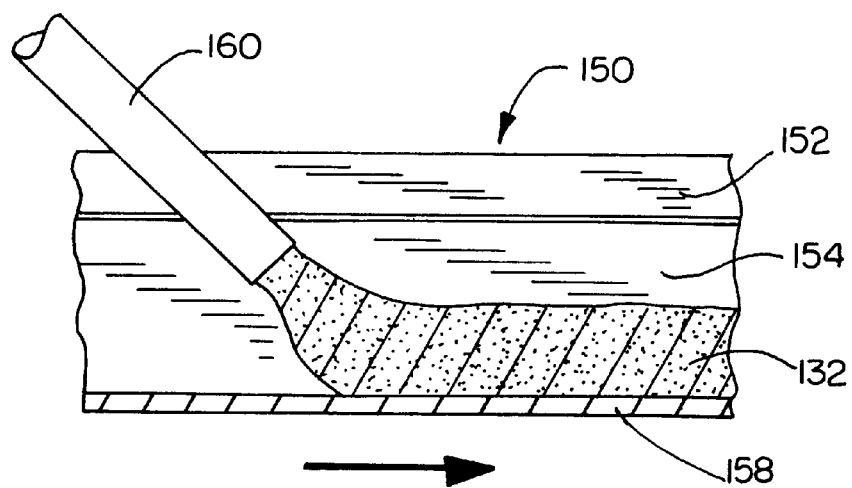
FIG. 6 is a cross-sectional view taken at line 6—6 of FIG. 5C, showing the desiccating matrix formulation in accordance with the present invention flowing into the nascent spacer in accordance with the method of the present invention.

In order to facilitate an understanding of the novel features of the present invention, reference is first had to an IGU of conventional design, which includes a conventional thermoplastic desiccant mastic or matrix, such as those illustrated in FIGS. 1 and 2. FIG. 1 is a cross-sectional view of a prior art IGU 10, as shown, for example in U.S. Pat. No. 5,177,916. The IGU 10 shown in FIG. 1 includes an edge assembly having a U-shape channel 20 disposed between two glass panels 14, which together create and define an interior space 22. The U-shape channel 20 includes side walls 18 which are sealed to the glass panels 14 by a moisture and/or gas impervious adhesive material 16, thereby sealing the interior space 22 from the outside environment. A desiccating mastic 26 is coated on the inside of the U-shape channel 20. The U-shape channel 20 continues around the entire outer edge and opens to the inside of the IGU. It is necessary for the desiccating mastic 26 to remain adhered to the inside of the U-shaped channel 20, even at elevated use temperatures, in parts of the spacer which are inverted and downwardly opening, or otherwise the desiccating mastic would fall out of the channel 20 and into the interior space 22. The use temperatures can easily reach 85° C. At such temperatures, the desiccating mastic may soften or lose its adhesion to the U-shaped channel, thereby protruding into the visible portion of the interior space of the IGU, in a failure known in the art as "sag" or "sagging". The prior art desiccating mastic of the '916 patent, while being pumpable, is limited by the requirements that it remain coated on the edge assembly and that it not sag.

FIG. 2 is a perspective, partial cut-away view of another prior art IGU 40. The IGU 40 shown in FIG. 2 includes an edge assembly having a closed spacer 42 which has a longitudinally extending slit 44 at the closure of the spacer 42. The spacer 42 is disposed between two glass panels 46, to create and define an interior space 48. The spacer 42 is sealed to the glass panels 46 by a moisture and/or gas impervious adhesive material 50, thereby sealing the interior compartment 48 from the outside environment.

The spacer 42 may be formed by a roll forming operation by which a flat strip of material is gradually formed into the spacer 42. The final step in formation of the spacer 42 closes the spacer, creating the slit 44. A prefabricated extruded rope or cord 56 containing a desiccating material is removed from a spool and inserted into the open end of the spacer 42.

The desiccating cord 56 suffers from the drawback that it must be protected from moisture. Since the desiccating cord 56 is heavily loaded with desiccant, the cord 56 must be protected from atmospheric moisture between the time it is manufactured and the time it is inserted into the spacer 42 and the IGU 40 is finally sealed from the external atmosphere during the manufacturing process. Thus, the prior art desiccating cord 56, while in some ways convenient, requires special handling between the time it is manufactured and the time it is used, in consideration of its inherent tendency to absorb moisture. For these reasons, as discussed above, the DESI-ROPE® material is supplied in vacuum-sealed, moisture-proof foil bags which are in turn packaged in high density polyethylene bags, and shipped in cardboard boxes.

The present invention resolves the problems associated with the foregoing conventional desiccating materials for IGUs. In one embodiment, the thermoplastic desiccating matrix formulation of the present invention may be dispensed by commercially available hot melt equipment during manufacture of the spacer for an IGU, contains a high loading of desiccant, and is retained within the closed spacer without adhering to the spacer. As a result of the high loading of desiccant and the increased surface area exposed to the atmosphere in the interior of the IGU, the matrix maximizes the absorption of moisture and VOCs from the interior of the IGU. The feature of being dispensable from hot melt equipment results in easy application by means of conventional hot melt equipment and thus the matrix formulation is easily adaptable to many presently existing IGU production lines. Another benefit is that since the desiccating matrix formulation may be stored in and dispensed directly from bulk containers such as drums, there is no need to take additional protective steps to keep the formulation from inadvertent exposure to moisture. The high loading of desiccant provides a long life to the IGU without necessitating use of large quantities of desiccating matrix. The fact that the desiccating matrix is retained within the confines of a closed spacer avoids the requirement that the matrix be coated on the spacer, while avoiding the danger of failure by sagging during use at normal use temperatures.

FIG. 3 is a perspective, partial cut-away view of an IGU in accordance with the present invention. As shown in FIG. 3, the IGU of the present invention includes two glass panels 114 which are separated by an edge assembly which includes a closed spacer 120. The spacer 120 has a longitudinally extending slit 121, which results when the spacer 120 is formed by roll forming a strip of metal to form the spacer 120. In the IGU 110, the spacer 120 is disposed between two glass panels 114, which together form an interior space 122. The spacer 120 is sealed to the glass panels 114 by a moisture and/or gas impervious adhesive material 124. Thus, the panels 114, the spacer 120 and the adhesive material 124 together form the edge assembly which thereby seals the interior space 122 of the IGU from the outside atmosphere. The hollow spacer 120 includes walls which together define an interior cavity 128. A desiccating matrix 132 is formed from a non-adhering, thermoplastic desiccating matrix formulation, and is contained within the interior cavity 128. The matrix 132 remains in a solid state and remains non-adhesive even at the maximum temperature to which an IGU is normally exposed during use, e.g., at temperatures up to about 85° C.

As used herein, the term "closed" with respect to the spacer, means that the spacer is closed to a degree sufficient to retain the desiccating matrix within the confines of the spacer. The closed spacer is not hermetically sealed; on the contrary it should be in fluid communication with the interior space of the IGU, so as to provide contact between the desiccant in the desiccating matrix and the moisture and/or VOCs which may be present in the atmosphere in the interior space of the IGU. In accordance with this definition, the space between the edges of the spacer which are brought together during the below described roll-forming operation need only be sufficiently smaller than the size of the solidified desiccating matrix (or otherwise physically confined) such that the matrix will remain within the interior of the spacer at all times.

The spacer may be made by processes other than roll forming, and may be formed of materials other than metal. For example, the spacer may be made of a thermoplastic or thermosetting material, which may be, for example, formed by an extrusion process. In an extrusion process, the spacer may be closed prior to placement of the desiccating matrix formulation therein. In one embodiment, the spacer material is extruded and is cooled by extrusion into a water bath. The desiccating matrix formulation may be applied through an injection nozzle which is concentrically placed in the extrusion nozzle, whereby the desiccating matrix formulation is applied to the cooled, solidified spacer.

In one embodiment, the spacer is formed by a roll forming process, and after being closed by a final roll forming step, the spacer is spot welded to increase its torsional stability, in a welding step.

In one embodiment, the desiccating matrix formulation is applied at an elevated temperature and then solidified, as by cooling to ambient temperatures. In this embodiment, a desiccating matrix formulation which may have some adhesive character at the elevated temperature at which it is dispensed, is allowed or caused to cool prior to coming into contact with the spacer, so that it loses its adhesive character and does not stick to the spacer. The matrix formulation may be allowed, for example, to cool subsequent to being dispensed, but prior to contacting the surface of the spacer by providing a sufficient distance between the location at which the matrix formulation exits the dispensing apparatus and the surface of the spacer so that by the time the matrix reaches the surface of the spacer it has cooled and thereby at least partially solidified. The matrix formulation may be caused to cool subsequent to being dispensed, but prior to contacting the surface of the spacer by providing a cooling device, such as a fan or a source of compressed air or other gas, which is directed upon the desiccating matrix formulation as it issues from the dispensing apparatus, thereby causing the matrix to cool and at least partially solidify, particularly at its surface.

The spacer 120 of the present invention preferably is made from a flat strip of metal by a conventional roll-forming operation. In one embodiment, the formulation which forms the matrix 132 is dispensed onto an interior surface of the spacer 120 just before the final steps of the roll-forming operation, during which the spacer 120 is closed, forming the slit 121. In another embodiment, the matrix 132 is formed when the matrix formulation is fed through the slit 121 after the spacer has been closed, such as by use of a nozzle that extends through the slit and into the spacer. It is possible that the desiccating matrix formulation may be applied to the strip at any point during the roll forming operation. However, practical considerations, such as the possibility of the roll forming apparatus coming into contact with the matrix 132, may limit the choice of application points.

FIG. 4 is a schematic side elevational view of a roll-forming apparatus that may be used to roll-form a flat strip of material 150. The roll-forming apparatus shown in FIG. 4 includes a series of pairs of interacting upper and lower rollers 180, 181, 182,183,184 and 185. As the strip 150 is fed into the roll-forming apparatus from left to right, the rollers 180–185 progressively bend the metal strip, converting it eventually from the initial flat strip into a fully formed spacer. It is noted that additional pairs of roll-forming rollers may be required, in addition to those schematically shown in FIG. 4.

FIGS. 5A–5D are schematic cross-sectional views of an exemplary strip of spacer material at certain points during the roll-forming process. While the exact sequence of steps involved in such a roll-forming operation are within the skill of and would be decided by a person of skill in the art, the sequence shown in FIGS. 5A–5D is illustrative of the process. As shown in FIG. 5A, a piece of metal feed material 150 in the form of a flat strip is provided, and is fed into a roll-forming apparatus. In a first step, the outer ends of the material 150 are rolled or bent upwards to form edges 152 as shown in FIG. 5B. In a subsequent step, additional bends are made so as to roll up portions of the flat portion of the material 150 to form side walls 154 and inner walls 156, and leaving the outer wall 158, as shown in FIG. 5C. Finally, in subsequent steps, the additional bends are brought to their final angles, thereby forming the side walls 154, the inner walls 156 and outer wall 158, from the material 150, thereby transforming the material 150 into a closed spacer 120.

FIG. 6 is a cross-sectional view taken at line 6—6 of FIG. 5C, showing one embodiment of the present invention, in which a desiccating matrix formulation is flowed into the nascent spacer. In the method of forming the spacer and applying the desiccating matrix formulation thereto, the formulation may be dispensed as schematically shown in FIG. 6. In this operation, normally the nascent spacer 150 would be passed by the stationary dispensing apparatus 160, but the nascent spacer 150 may be held stationary while the dispensing apparatus 160 is moved, or both may be in motion. If the location at which the formulation exits the dispensing apparatus 160 is elevated further than is shown in FIG. 6, the matrix will be allowed to cool further prior to contacting the surface of the spacer 150, all other things being equal. Similarly, at or near the location at which the formulation exits the dispensing apparatus 160, a cooling device may be provided. Such a cooling device may simply be a fan or other source of compressed air. The cooling device may also include a cooling belt, in which the desiccating mastic formulation is initially applied to a cooled moving belt surface and is subsequently fed into the nascent spacer. Other means of cooling the dispensed formulation may be used.

The nascent spacer 150 should be passed by the dispensing apparatus 160 at a speed which matches the flow rate of the formulation exiting the dispensing apparatus. In one embodiment, the spacer is moved at the rate of about 120 feet per minute. In one embodiment, the spacer is approximately one-half inch (1.25 cm) wide, and the desiccant loading is desirably about 3 grams per foot, for an IGU having a one-half inch space between panes of glass. The amount of desiccant may be varied, depending on the volume of the space and the desired useful life of the IGU, among other factors, which would be known to a person of skill in the IGU art. If the formulation comprises 50% desiccant, a total of about 6 grams per foot of the matrix should be provided for the spacer. Thus, the flow rate of the desiccating matrix formulation exiting the dispensing apparatus should be about 720 grams per minute.

In one embodiment, the desiccating matrix is dispensed such that it forms a bead approximately ³⁄₁₆ inch (4.8 mm) in diameter. It is recognized that due to the flowable, liquid character of the matrix formulation, the bead may collapse into a flattened, elliptical or ovoid shape. Thus, the diameter is used as a convenient term only to describe the approximate volume of the matrix if it maintained a substantially round shape. Of course, the dispensing nozzle may have a cross-section other than circular, as may be desired in some instances.

Figure 7A:
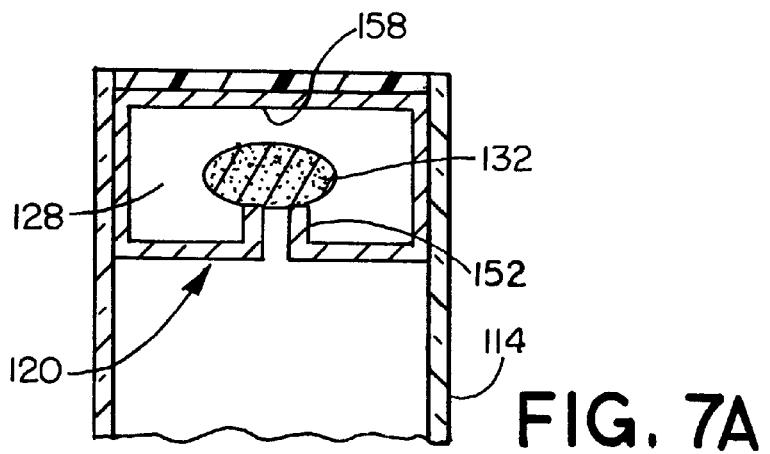
FIGS. 7A and 7B are schematic cross-sectional views of, respectively, an upper edge and a lower edge of a spacer in an IGU containing the desiccating matrix in accordance with the present invention.
Figure 7B:
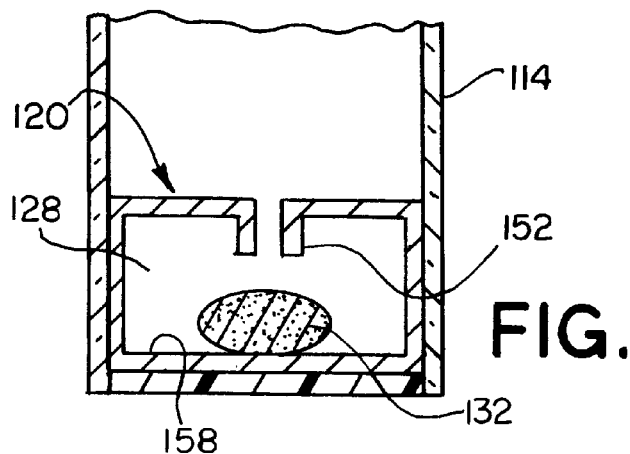

FIGS. 7A and 7B are schematic cross-sectional views of, respectively, an upper edge and a lower edge of a spacer in an IGU containing the desiccating matrix in accordance with the present invention. As shown in FIG. 7A, the matrix 132 rests upon the folded-in edges 152 of the spacer 120. As shown in FIG. 7B, the matrix 132 rests upon an interior surface 158 at the closed outer side of the spacer 120. These figures illustrate schematically that the matrix does not adhere to the surfaces of the spacer.

The matrix 132 preferably is formed by heating the thermoplastic desiccating matrix formulation to a temperature in the range of about 85° C. to about 200° C. and dispensing by pumping the formulation into the partially formed cavity 128 of the spacer 120 during the roll-forming operation. The formulation has a sufficiently low viscosity that it may be pumped, for example, by standard hot melt dispensing equipment when heated to a temperature in the range from about 85° C. to about 200° C. That is, the viscosity of the heated formulation is less than about 2,000 Kcps (thousand centipoise). In one embodiment, the maximum viscosity is about 1,750 Kcps. In one embodiment, the viscosity is in the range from about 50 to about 100 Kcps. In one embodiment, the viscosity is in the range from about 50 to about 500 Kcps. In one embodiment, the viscosity is in the range from about 100 to about 1,000 Kcps.

In addition to being dispensable by hot melt equipment, a preferred formulation has little or no adhesiveness even when molten. As used herein, the terms "non-adhering", "lacking adhesion", and "not adhere" mean that the matrix does not form a significant adhesion to the substrate to which it is applied. The formulation may have an initial adherence on contact, but loses the adherence when the formulation is solidified. In fact, initial adhesion may be desirable for drawing the formulation with the spacer during dispensing. A simple test to determine a lack of adhesion is described in more detail below.

The formulation preferably should be non-adhering at temperatures about 10–15° C. lower than the minimum temperature at which it would be dispensed by hot melt equipment. It is recognized that the formulation may have a small degree of adhesiveness at the application temperature, but it is contemplated that at least upon cooling below its softening point, little or no adhesiveness will remain. Thus, once the matrix 132 has formed when the formulation is allowed to cool, it should either not adhere to the interior of the spacer 120 at all, or it should adhere so little that it will release from the spacer 120 when the spacer is rotated about its longitudinal axis by 90° from its position shown in FIG. 7B and gently impacted with a force that will not damage the IGU.

Such gentle impact may involve tapping the spacer manually, tapping the spacer against a solid structure such as a floor or table, the shaking or jostling that arises from normal handling of the spacer prior to and during installation in an IGU, or the bending of the spacer to fit the IGU during manufacture of the IGU. In experiments, it was demonstrated that simply allowing the spacer with the initially-adhering desiccating matrix thereon to drop from a height of approximately 6 inches was a sufficient force to separate an initially-adhering desiccating matrix. As stated above, it is preferred the desiccating matrix not adhere at all, but in some cases the desiccating matrix may adhere temporarily. The terms "adhere temporarily" or "initially-adhering", when applied to a desiccating matrix formulation in accordance with the present invention, mean that with application of a gentle impact, approximately equivalent to dropping the spacer with the desiccating matrix thereon from a height of about six inches, the desiccating matrix is freed or released from any adhesion to the spacer.

In a simple laboratory measurement of the force needed to free a desiccating matrix having a preferred formulation in accordance with the invention from its initial adhesion to a substrate, the following procedure was used. To a strip of metal weighing about 12 grams and disposed horizontally was applied a 6 gram bead of a desiccating matrix. Upon cooling, when the strip was turned from the horizontal to a vertical position, the desiccating matrix did not spontaneously release from the substrate. Thus, the desiccating matrix could be said to have initially adhered to the substrate. The test strip was raised six inches above the floor and dropped, whereupon the desiccating matrix was dislodged from the substrate.

The matrix 132 may be formed of a thermoplastic material which sets up rapidly once it cools below the application temperature. Thus, a thermoplastic material is preferred which has a melting point or melting range close to the hot melt application temperature range of about 85° C. to about 200° C. The thermoplastic material used for the formulation preferably has a melt viscosity which is very low, so that it is easily flowable once it is melted. On the other hand, the formulation preferably sets up rapidly to form the matrix 132 when it cools. Preferably, since the lowest application temperature is generally about 85° C., the matrix 132 will be fully set up and will have lost any adhesiveness by the time it cools to a temperature in the range of about 70° C. to about 75° C. This is in accord with the feature that the matrix 132 not develop any adhesiveness when reheated to and held at temperature as high as 70° C. for an extended period of time.

Alternatively, the matrix 132 may be made from a flowable polymeric matrix formulation which is a thermoset or which cures after application. Examples are given in the formulations section below. With these formulations, the flowable polymeric matrix is usually applied at about room temperature, or the ambient temperature of the manufacturing environment. The polymerization reaction of the flowable polymeric matrix causes the matrix to solidify, as opposed to the cooling of a thermoplastic formulation, which causes the solidification of those formulations.

Even though the matrix 132 may be heavily filled with desiccant, a preferred formulation is flowable and therefore dispensable at temperatures at which hot melt materials are normally dispensed. In one embodiment, the matrix 132 is a non-adhesive solid when applied to an IGU and cooled to a temperature in the range of about 70° C. to about 75° C. In one embodiment, the matrix 132 after cooling to a temperature in the range of about 70° C. to about 75° C., is a firm, non-tacky solid. The matrix 132 is physically retained within the confines of the spacer 120 due to the fact that the spacer 120 is closed. For this reason, it is not necessary for the matrix 132 to adhere to the inside of the spacer 120. In fact, it is desired that the matrix 132 not adhere to the inside of the spacer 120, since as a result of not adhering, the entire surface of the desiccating matrix 132 is exposed to the atmosphere in the interior space of the IGU, thereby to provide maximum adsorption of moisture and VOCs. Thus, the matrix 132 features the benefits of containing a high loading of desiccant, being dispensable by commercially available hot melt equipment or the like, and being non-adhering. In addition, the matrix 132 does not develop adhesion even at temperatures up to about 70° C. for extended periods. Thus, essentially the entire surface area of the matrix 132 remains exposed to the atmosphere in the interior space 122 of the IGU.

Since the formulation which forms the matrix 132 can be dispensed from commercially available hot melt equipment or the like, it can be shipped and stored as a solid in sealed drums, then be melted and dispensed into the edge assembly of the IGU 110 when needed. This benefit reduces to a minimum the time the matrix 132 is exposed to atmospheric moisture. As a result, the bulk formulation does not require any special protective measures, other than storage in the closed drums in which it may be shipped and from which it may be dispensed, to avoid exposure to the open atmosphere or other sources of moisture prior to use. When ready for use, the drum may be opened, attached to the hot melt pumping equipment, the bulk material heated to melting and thence pumped directly to the spacer into which it is to be dispensed. The formulation forming the matrix 132 is applied to the spacer soon or immediately after the drum is opened and just prior to final closure of the IGU. Therefore, there is no concern about exposure of the desiccant to the atmosphere outside the IGU prior to use.

An additional benefit of the non-adhering feature of the present invention is the ease of cleaning the dispensing equipment following its use. Most adhesive materials are difficult to clean, requiring use of solvents, heat and various physical efforts to remove the adhesive materials after use.

As used herein, a formulation is considered "dispensable by hot melt equipment" if it can be dispensed by heating, melting and pumping by means of standard, commercially available hot melt dispensing equipment. The criteria of dispensability with conventional industrial hot melt applicators allows the formulation of the present invention to be used by existing equipment. Thus, the present method of applying the desiccating matrix to an IGU may be easily introduced into and adapted for use in many existing IGU production lines.

To assure that the formulation will provide the maximum surface area to the atmosphere inside the IGU, in one embodiment, the formulation should at minimum develop no adhesion and not sag when installed in the IGU and maintained at a temperature of at least 60° C. (140° F.) for a continuous period of at least 14 days. In one embodiment, the formulation will withstand at least 70° C. (158° F.) for at least 14 days without developing a significant amount of adhesion or sagging. In one embodiment, the formulation will withstand at least 70° C. (158° F.) for at least 1 month without developing any adhesion or sagging.

Methods

The present invention provides a method of making an edge assembly for an insulating glass unit. A preferred method involves (1) dispensing a flowable desiccating matrix formulation onto a portion of the spacer which will be inside the hollow spacer when the spacer has been closed; (2) allowing or causing the formulation to solidify into a solid matrix and to detach from any attachment to the spacer; and (3) closing the spacer whereby the detached matrix will be retained within the spacer.

More particularly, the thermoplastic desiccant-loaded formulation is heated to a temperature in the range of about 85° to about 200° C. and dispensed onto a portion of the spacer which will be inside the hollow spacer when the spacer has been closed. The formulation is cooled into a solid desiccating matrix and is detached from the spacer.

The process of forming a spacer for an IGU by a roll forming process is well known in the art, and has been generally described above. Simply stated, a strip of material, usually a metal, is passed through a series of rollers which gradually bend and fold portions of the strip into a desired shape, in this case as a spacer for an IGU. The desiccating matrix may be applied at any convenient point during the roll forming process. It will generally be preferred to apply the matrix at a time when the spacer has a U-shape, or when the sidewalls of the spacer have been formed, to avoid the necessity of applying further rollers to the nascent spacer in the proximity of the matrix. Since the preferred matrix does not significantly adhere to the surface of the spacer, applying the matrix at a time when the spacer has a U-shape avoids the possibility of the matrix escaping the spacer during subsequent roll forming operations. Subsequent to application of the matrix, the spacer is subjected to further roll forming operations to substantially close the spacer, forming for example a box-like enclosed spacer like that shown in FIG. 3 which retains the matrix within the box-like spacer. The enclosure needs to be closed to a degree which, at a minimum, retains the matrix therein, but which allows the desiccant to be exposed to the interior atmosphere of the IGU.

The enclosure is formed such that the interior of the hollow spacer is in fluid communication with the interior space of the IGU. The communication may be by way of the longitudinal slit 44, or may be by means of other openings made in the spacer to provide the communication.

The final desired shape may be shaped as a closed "C" or may be more box-like, in which the sides of a U-shaped intermediate are bent inward, towards one another, to form a closed box-like spacer, an example of which is shown in FIG. 5D. The box-like spacer is the preferred spacer for use with the present invention. However, other shapes may be used within the scope of the invention. The spacer retains the desiccating matrix as a result of its physical shape, as opposed to the desiccating matrix being held in position by adhering to the spacer.

As described above, the melted formulation is dispensed into a nascent spacer, during the process of roll forming a strip of metal into a spacer for an IGU. The spacer may be made by other processes, but a roll forming process is preferred.

In one embodiment, the actual dispensing temperature is in the range from about 85° C. to about 200° C. (about 185° F. to about 248° F.). In another embodiment, the actual dispensing temperature is in the range from about 90° C. to about 140° C. (about 194° F. to about 284° F.). In another embodiment, the actual dispensing temperature is in the range from about 85° C. to about 130° C. (about 185° F. to about 266° F.). In another embodiment, the actual dispensing temperature is about 110° C. (about 230° F.). In another embodiment, the actual dispensing temperature is about 115° C. (about 239° F.). In another embodiment, the actual dispensing temperature is about 130° C. (about 266° F.). In another embodiment, the actual dispensing temperature is about 140° C. (about 284° F.). In another embodiment, the actual dispensing temperature is about 160° C. (about 320° F.). In another embodiment, the actual dispensing temperature is about 180° C. (about 356° F.). In another embodiment, the actual dispensing temperature is about 200° C. (about 392° F.). Higher actual dispensing temperatures may be used, but are not generally favored for safety and/or energy conservation reasons.

Once the formulation has been applied to the nascent spacer, it is allowed to cool to form the matrix. At the same time, the remaining steps of forming the spacer may be completed. The completed spacer may have an adhesive applied to the appropriate outer surfaces and the IGU assembled in known fashion thereafter.

In other embodiments, the flowable desiccating matrix formulation may be applied at ambient temperatures. In these embodiments, the formulation is a curable formulation and may be a thermosetting formulation. In these embodiments the formulation may comprise a one-part curable formulation or a two-part curable formulation. Examples of such formulations are provided below. In these embodiments, the desiccating matrix formulation would be flowable and capable of being pumped by ordinary equipment, but would not require heating, as would hot melt type formulations.

In one embodiment the matrix does not adhere at any time to the spacer. In some embodiments, a small degree of initial adhesion may be observed. As needed, the matrix may be released by simply rotating the spacer or tapping the spacer with a hard object, such as tapping the spacer against the floor, a wall or some other object. Due to the low adhesiveness of the matrix, very little force is required to dislodge the matrix in the event that it temporarily adheres to the inner walls of the spacer.

In one embodiment, the method places a thermoplastic desiccating matrix formulation into an edge assembly for an insulating glass unit. The edge assembly together with at least two glass panels forms the interior space of the insulating glass unit. The edge assembly includes a hollow spacer having interior walls in fluid communication with an atmosphere within the interior space of the IGU. In another embodiment, the method includes (1) heating a thermoplastic desiccating matrix formulation to a temperature in the range of about 85° to about 200° C., (2) dispensing the formulation onto a portion of the interior walls of the spacer; (3) allowing the formulation to cool to a temperature at which the formulation solidifies to form the matrix; and (4) freeing the matrix from any adhesion to the interior walls.

In one embodiment of the present invention, the method is used for making an insulating glass unit including at least two glass panels and a hollow spacer having an interior wall and separating the glass panels to form an interior space of the IGU, the hollow spacer retaining therein the thermoplastic desiccating matrix. In this embodiment, the method includes (1) heating a thermoplastic desiccating matrix formulation to a temperature at which it is flowable; (2) dispensing the formulation onto the interior wall of the hollow spacer; (3) allowing the formulation to cool to a temperature at which it solidifies to form the matrix; and (4) freeing the matrix from any adhesion to the spacer.

In one embodiment, the invention provides a method for making an insulating glass unit, including at least two glass panels and a hollow spacer separating the glass panels, the panels and spacer forming an interior space of the IGU, the hollow spacer retaining therein a desiccating matrix. In this embodiment, the method includes (1) heating a thermoplastic desiccating matrix formulation to a temperature at which it is flowable; and (2) dispensing the formulation into the hollow spacer under conditions such that it forms a solid matrix which does not adhere to the spacer.

Formulations

THERMOPLASTIC POLYMERIC MATERIAL

In one embodiment, the inventive thermoplastic desiccating matrix formulation comprises from about 30 weight % to about 80 weight % of a thermoplastic polymeric material. In another embodiment, the inventive formulation comprises from about 40 weight % to about 60 weight % of a thermoplastic polymeric material. In another embodiment, the inventive formulation comprises from about 45 weight % to about 55 weight % of a thermoplastic polymeric material. In another embodiment, the inventive formulation comprises about 50 weight % of a thermoplastic polymeric material. In another embodiment, the inventive formulation comprises at least about 50 weight % of a thermoplastic polymeric material.

In various embodiments, the thermoplastic polymeric material may be one or more of poly alpha olefins (poly-α-olefins) and copolymers of poly alpha olefins, polyethylene and copolymers of polyethylene; polyacrylates and polymethacrylates; polyimides; polycarbonate; polyesters; polystyrene and copolymers of polystyrene; polyvinyl chloride and copolymers of polyvinyl chloride; polyvinylidene chloride and copolymers of polyvinylidene chloride; polymethylene oxide; polyethylene oxide; polypropylene oxide; polyphenylene oxide; thermoplastic elastomers and ionomers; polyvinyl acetate; polybutadiene; and elastomers such as natural and synthetic rubbers.

More specifically, polymers useful in this invention may include: polymers of ethylene, such as linear low density polyethylene (LLDPE) and low density polyethylene (LDPE); polyethylene co-vinyl acetate; polyethylene co-acrylic acid (or acrylic acid esters i.e. methyl, ethyl, butyl); polyethylene co-vinyl alcohol; polyethylene co-maleic anhydride; polypropylene; polypropylene co-alpha olefin (i.e. ethylene, butylene, hexene); polybutylene, polyisobutylene, and other polyalphaolefins (i.e. 1-hexene, 1-octene); polyamides (typically polyamides of fatty acid dimers); polyesters (from dibasic acids or from (alpha)-(omega) hydroxy acids); polyethylene oxide; polydimethylsiloxane polymers; polystyrene, poly-alpha-methyl styrene, and polyvinyl toluene; PVC and PVC copolymers with acrylic acid and/or acrylic acid esters; polyurethane thermoplastics; styrenic thermoplastic elastomers; polyvinyl acetate; polybutadiene; and natural and synthetic rubber. Specific formulations tested are shown in the Examples.

The commercial materials used in the examples are identified as follows. A polybutylene designated DP 8510 is available from Shell Chemical Co. Ethylene vinyl acetate copolymers designated ESCORENE®D are available from Exxon Chemicals with various vinyl acetate content. ESCORENES UL7710 is an EVA containing about 18 weight % vinyl acetate. ESCORENE® MVO 2514 is an EVA containing about 14 weight % vinyl acetate. ESCORENE® MVO 2520 is an EVA containing about 20 weight % vinyl acetate. ESCORENE® MVO 2528 is an EVA containing about 28 weight % vinyl acetate. A LLDPE designated GA 594 available from Equistar. A styrenic thermoplastic elastomer designated KRATON® D 1107 is available from Shell Chemical Co. An ethylene-methyl acrylate copolymer designated Optima TC 120 is available from Exxon Chemicals. An ethylene-acrylic acid copolymer designated Allied AC 617 is available from Allied. A process oil plasticizer designated SUNPAR® 2280 is available from Sun Chemical Co. A fatty acid dimer polyamide designated VERSAMID® 757 is available form Henkel. A hydrogenated rosin ester designated FORAL® 85 is available from Hercules.

While the useful molecular weight naturally varies according to the specific polymer, the polymeric materials useful in the present invention typically include materials having a molecular weight above about 2500 g/mol, but may include materials of less than 2500 g/mol. In one embodiment, the weight average molecular weight is in the range from about 2,000 to about 3,000 g/mol. In another embodiment, the weight average molecular weight is in the range from about 2,500 to about 5,000 g/mol. In another embodiment, the weight average molecular weight is in the range from about 2,000 to about 100,000 g/mol. In another embodiment, the weight average molecular weight is in the range from about 2,500 to about 25,000 g/mol. In another embodiment, the weight average molecular weight is in the range from about 2,000 to about 6,000 g/mol. In another embodiment, the weight average molecular weight is about 2500 g/mol. In each of the foregoing embodiments, the range of molecular weights in the thermoplastic polymeric material preferably should be as narrow as possible, thereby contributing to a sharp melting point.

The thermoplastic material used in the foregoing formulations preferably should be moisture-permeable. As used herein, the term moisture-permeable means that the material has a moisture permeability of at least about 1 gm/24 hr/1 ml/mil at 37.8° C. (100° F.), 90% relative humidity, as determined by ASTM E-96-66 Method E. In one embodiment, the thermoplastic material has a moisture permeability of at least about 10 gm/24 hr/1 ml/mil at 37.8° C. (100° F.), 90% relative humidity, as determined by ASTM E-96-66 Method E. In one embodiment, the curable polymeric material has a moisture permeability of at least about 10 gm/24 hr/1 m²/mil at 37.8° C. (100° F.), 90% relative humidity, as determined by ASTM E-96-66 Method E. In one embodiment, the thermoplastic material has a moisture permeability of at least about 30 gm/24 hr/1 m²/mil at 37.8° C. (100° F.), 90% relative humidity, as determined by ASTM E-96-66 Method E. In one embodiment, the curable polymeric material has a moisture permeability of at least about 30 gm/24 hr/1 m²/mil at 37.8° C. (100° F.), 90% relative humidity, as determined by ASTM E-96-66 Method E.

Adsorbent Material

In one embodiment, the inventive thermoplastic desiccating matrix formulation comprises from about 70 weight % to about 20 weight % of an adsorbent material which includes a moisture absorbing material and a volatile organic chemical absorbing material. In another embodiment, the inventive formulation comprises from about 60 weight % to about 40 weight % of an adsorbent material. In another embodiment, the inventive formulation comprises from about 55 weight % to about 45 weight % of an adsorbent material. In another embodiment, the inventive formulation comprises about 50 weight % of an adsorbent material. In another embodiment, the inventive formulation comprises at least about 50 weight % of an adsorbent material.

The adsorbent material may be one or more of the known moisture adsorbing materials, in combination with one or more of the known low molecular weight organics (including, but not limited to, VOCs) absorbing materials. The adsorbent material may be one or more of molecular sieve, diatomaceous earth, zeolite (e.g., chabasite, gumerinite, levynite, erinite, mordenite and analcite) activated carbon, activated alumina, silica gel, silica-magnesium gel, silica-alumina gel, and calcium oxide, each of which are capable of absorbing both moisture and VOCs.

In one embodiment, the adsorbent material is molecular sieve. Molecular sieve is a particularly effective absorbent of both moisture and low molecular weight organics. In one embodiment the molecular sieve is a mixture of 3A and 13X sieve. The 3A molecular sieve is preferred for adsorption of water, and is capable of adsorbing some VOCs. The 13X molecular sieve also adsorbs VOCs and water. In one embodiment, the molecular sieve may comprise 4A and/or 5A molecular sieves, instead of or in addition to the 3A and 13X molecular sieves. In one embodiment, the adsorbent component is exclusively 3A molecular sieve. In another embodiment, about 95 weight % 3A molecular sieve and about 5 weight % 13X molecular sieve are included. In another embodiment, about 90 weight % 3A molecular sieve and about 10 weight % 13X molecular sieve are included. In another embodiment, about 80 weight % 3A molecular sieve and about 20 weight % 13X molecular sieve are included. In another embodiment, about 70 weight % 3A molecular sieve and about 30 weight % 13X molecular sieve are included. In another embodiment, about 65 weight % 3A molecular sieve and about 35 weight % 13X molecular sieve are included. In another embodiment, about 60 weight % 3A molecular sieve and about 40 weight % 13X molecular sieve are included. In another embodiment, approximately equal weights of the 3A and 13X molecular sieves are included. In one embodiment, the mixture contains from about 80 weight % to about 95 weight % of 3A molecular sieve. Similar ranges of amounts of 4A and 5A molecular sieve may be used.

Tackifiers

Tackifiers are a class of chemicals used to modify the viscoelastic properties of a polymer system. Tackifiers can be made from resins obtained from petroleum feedstocks or from natural raw materials such as wood rosin. Resins may be made from monomers obtained from petroleum feedstocks, such as styrene or piperline. A particularly useful resin is ENDEX® 160 or 155, which is a poly-α-methyl styrene available from Hercules. Resins are typically lower in molecular weight than polymers, but may have higher molecular weight than polymers with which the resins are used. Resins typically have a softening point or range as opposed to a sharp melting point such as is observed with crystalline materials.

In one embodiment, the desiccating matrix formulation comprises a resin mixed with molecular sieve. The ratio of resin to molecular sieve may be similar to those disclosed above with respect to thermoplastic polymers. Resins are preferably added to thermoplastic polymers to modify the viscoelastic properties thereof, but may in some cases be used alone. Thus, the tackifier could replace all of the thermoplastic in the desiccating matrix formulation of the present invention.

Tackifiers which may be used with the present invention include hydrocarbon resins prepared from C5 monomers, hydrocarbon resins prepared from C9 monomers, hydrocarbon resins prepared from both C5 and C9 monomers, terpene hydrocarbon resins, phenolic tackifying resins, terpene-phenolic tackifying resins, dicyclopentadiene tackifying resins, pure monomer tackifying resins (styrene and styrene derivatives), glycerol esters of rosin, and pentaerythritol esters of rosin. The tackifier may be a hydrogenated rosin ester, for example an ester of abietic acid.

The tackifier may be present in the desiccating matrix formulation in an amount ranging from 0% to 40% by weight of the formulation. In one embodiment, the formulation comprises about 5% by weight of the tackifier. In one embodiment, the formulation comprises about 25% by weight of the tackifier. In one embodiment, the formulation comprises from about 5% by weight to about 25% by weight of the tackifier.

Waxes

Waxes are a class of compounds having viscosities quite susceptible to changes in temperature. Waxes are classified by their origin, animal, vegetable, mineral, and synthetic. Waxes are often used in hot melt formulations to reduce viscosity at elevated temperatures. In one embodiment, the desiccating matrix comprises a single wax mixed with molecular sieve. The ratio of wax to molecular sieve may be similar to those disclosed above with respect to thermoplastic polymers. In the present invention, waxes may be substituted for the thermoplastic polymer component, or may be added to the thermoplastic polymer to modify the properties thereof.

Waxes which are useful in the present invention include animal waxes, beeswax, vegetable waxes, carnauba wax, Japan wax, mineral waxes, montan wax, paraffin wax, synthetic wax, microcrystalline wax, polyethylene waxes, and polyethylene glycol waxes.

In one embodiment, the desiccating matrix formulation comprises mineral wax and molecular sieve. In another embodiment, the desiccating matrix formulation comprises paraffin wax and molecular sieve. In another embodiment, the desiccating matrix formulation comprises polyethylene wax and molecular sieve. In another embodiment, the desiccating matrix formulation comprises polyethylene glycol wax and molecular sieve.

The thermoplastic component of the desiccating matrix formulation may be entirely replaced by a wax. In the desiccating matrix formulation, a wax may be present in an amount ranging from 0% to about 45% by weight of the formulation. In one embodiment of the desiccating matrix formulation, a wax is present in an amount of about 35% by weight of the formulation. In one embodiment, a wax is present in an amount of about 5% by weight of the formulation. In one embodiment of the desiccating matrix formulation, a wax is present in an amount ranging from about 6% by weight to about 35% by weight of the formulation.

In general, addition or substitution of a wax is preferable to addition or substitution of a tackifier in the desiccating matrix formulation of the present invention.

Plasticizer

Plasticizers are added to polymers to facilitate compounding and to improve flexibility. In one embodiment, the thermoplastic desiccating matrix formulation includes a small amount of a plasticizer, in the range of about 1 weight % to about 5 weight %. In one embodiment, the amount of plasticizer is in the range from about 0.1 weight % to about 1 weight %. In another embodiment, the amount of plasticizer in is the range from about 1 weight % to about 2 weight %. In another embodiment, the formulation includes no plasticizer. If any amount of plasticizer is used, it should not result in adhesion of the to the spacer or the edge assembly at normal application or use temperatures. In other words, it should be non-adhering as defined herein. As shown in the examples, a plasticizer such as SUNPAR® 2280 may be used without causing adhesion of the desiccating matrix, but may cause some amount of fogging when tested in the stringent pot fogging test described below.

Plasticizers which may be used in the thermoplastic desiccating matrix formulation in accordance with the present invention include: phthalate, adipate, and sebacate esters, aryl phosphate esters, petrolatum, paraffinic process oil, napthenic process oil, and aromatic process oil.

Other Additives

The inventive thermoplastic desiccating matrix formulation may also contain additives known in the art, such as antioxidants, colorants, fillers, UV and thermal stabilizers and rheological modifiers, provided that they do not result in adhesion of the formulation to the spacer or edge assembly at normal use temperatures. The fillers which may be used include: plastic fiber, calcium carbonate, talc, clay, silica, barium sulfate, ground rubber and plastic scrap, oxides of zinc or titanium, carbon black, and wood or nut shell flour.

The amounts of other additives which may be included in the desiccating matrix formulation of the present invention are substantially similar to the amounts added to similar formulations, as would be understood by a person of skill in the art. The desiccant or adsorbent material used in the present invention provides many of the benefits of a filler, making it unnecessary to include an additional, separate filler.

In one preferred embodiment, plastic fibers, for example KEVLAR® brand plastic fibers are added to the formulation. In one embodiment, about 0.2% by weight of the formulation of KEVLAR® brand plastic fibers are added to the formulation. The amount of such fibers added may range from about 0.05% to about 0.5% by weight of the formulation. Such plastic fibers fe added to avoid or prevent the flowable material from becoming "leggy" during application in the flowable state of the desiccating matrix formulation, i.e., not breaking cleanly when the flow of the material is stopped.

Test Procedures

Canadian Volatile Fogging Test

As discussed in the foregoing, insulating glass units are subject to fogging if excessive amounts of moisture and/or VOCs are present in the interior space of an IGU defined by the glass panels and the edge assembly. The present desiccating matrix formulation is free of such fogging, based upon standard tests. The preferred standard in the industry is promulgated by the Canadian General Standards Board, as part of CAN/CGSB-12.8-97 for Insulating Glass Units, par.3.6.5, requires that IGUs shall show no evidence of fogging or residue when tested and viewed in accordance with par. 4.3.2, the volatile fogging test. Par. 4.3.2 "Volatile Fogging Test" sets forth the standard test for fogging in IGUs. The test procedure is briefly described as follows.

In the volatile fogging test, a pair of IGUs are set up in a test chamber. The inside of the test chamber is maintained at a temperature of 60±2° C., and is provided with a small circulating fan to maintain a uniform temperature in the chamber. The upper edge of the IGU is maintained at a temperature of 58±2° C., and the circulating fan is operated so as to maintain a temperature gradient from the upper edge to the lower edge of the IGU is no more than 12° C.

A cooling plate having water circulating therein is attached to one panel of the IGU, for the purpose of cooling the panel and establishing a temperature gradient between sides of the IGU similar to that to which an IGU in actual use might be exposed. The cooling water is maintained at a temperature of 22±2° C., at the point it exits the cooling plate.

The IGUs to be tested are exposed to these conditions for a period of seven days. At the end of this period, the IGUs are removed, cleaned, and mounted in a viewing box such that an observer may view the unit through the surface on which the cooling plate was placed during the test. The unit is observed for any evidence of fogging. Any fogging observed constitutes failure. In the present specification, the absence of fogging, or the criteria of being free of fogging means that the IGU in question passes this fogging test.

Pot Fog Test

An alternative fog test is known as the pot fog test. The pot fog test is more stringent that the Canadian fog test. The pot fog test indicates the tendency of a material to cause an oily deposit on glass, in a phenomenon also referred to as fogging. Fogging results in poor visibility through the glass caused by the condensation on the glass surface of volatile components in the material.

The pot fog test is conducted generally as follows. Clean, oil-free glassware must be used, and a blank determination should be run to provide a check on the glassware. Weigh 30 grams of test material into a petri dish. Place the petri dish in the bottom of a 1-liter beaker, with a thermocouple under the petri dish. Place the 1-liter beaker into a stainless steel 2-liter beaker containing sufficient heating media, such as DOW 550 fluid to cover at least one half the vertical height of the 1-liter glass beaker. Place a gasket made of blotter paper or other suitable material over the mouth of the beaker, and place a pane of glass over the blotter paper. The blotter paper should have an opening which is approximately ¼ inch smaller in diameter than the diameter of the 1-liter glass beaker. Insert a thermometer into the heating media. Place a condenser coil on the glass pane over the opening in the blotter paper. Place the stainless steel beaker on a hot plate and begin heating. The temperature should be adjusted such that the temperature sensed by the thermocouple is 85° C. to 90.6° C. (185° F. to 195° F.). A water supply is connected to the condenser coil, and water at a temperature of 21° C.–24° C. (700–750° F.) is passed through the condenser coil. The test is continued for a period of 16 hours.

At the end of the test period, the glass plate is removed and observed for the presence of any condensation or fog, by noting the amount of haziness at oblique angles against a dark background. Samples are visually rated as having none, slight, medium or heavy fog. It is preferred that the samples display no fog, but very slight fogging may be acceptable.

Adhesion Test

The purpose of the adhesion test is to determine if a hot-applied thermoplastic formulation will adhere to a specified clean substrate. The choice of substrates actually tested is determined by the particular end use of the matrix, and the material to which the matrix is to be applied in actual use. Application temperature is similarly governed by the melt properties of the matrix and the end use. A constant temperature throughout the application must be maintained, for purposes of test uniformity. Because the degree of adhesion depends upon the contact area between the matrix and the substrate, the matrix is preferably applied through an orifice sized to produce a bead of approximately 3/16" (0.1875 in, 4.76 mm) diameter on the substrate. The exact size of the orifice may be different, but should be constant to provide valid comparisons between matrices.

Adhesion Test Equipment

Adhesive panels—Typically 1.5"–12" of specified substrate. Typical substrates include:

Electrolytic tin plated steel (T-4 temper, #5 finish)

Type 201 or 430 Stainless steel (#1 annealed, BA finish)

3003 Alloy Aluminum (H-19 temper)

The selected substrate may be fastened to wooden carriers for ease of cleaning, handling and application of adhesive.

A typical applicator which is capable of maintaining a constant temperature is a melt flow index tester having a 0.1875" orifice. A pipe nipple with cap having a 0.1875" orifice drilled in the cap and a solid shaft snugly fitting into the internal diameter of the pipe nipple may also be used. Typical application temperatures include 93° C., 121° C., 149° C., 177° C. and 204° C. (200° F., 250° F., 300° F., 350° F., 400° F., respectively).

Adhesion Test Procedure

The metal test panel is first cleaned by wiping with a clean cotton cloth moistened with a solvent such as toluene, to remove any oils or residue from previous tests. The panel is next buffed lightly by hand using Grade "O" steel wool to remove any oxidation and to achieve a uniform surface. The freshly buffed panel is cleaned by wiping, using a clean cotton cloth dampened with isopropyl alcohol, to remove any residual steel wool, surface oxidation or other residue. Thereafter, the panel is allowed to condition at room temperature on the counter top for a minimum of 10 minutes before proceeding to apply the test matrix.

Once the panel has conditioned for a minimum of 10 minutes, it is ready for application of the test matrix. The temperature of the matrix must be controlled to +/−5.0° F. (+/−~2.5° C.) of the application temperature. The application of a straight or nearly straight bead of matrix (one must try to avoid laying a bead of matrix that is sinusoidal) must be done at a fairly rapid pace in order to achieve the appropriate application temperature. The heated matrix is pressed out of the application device and applied to the test panel as a 0.1875" bead. This can be achieved by holding the panel approximately 2 inches below the orifice in the application device, and allowing the bead to lay down on the panel as the panel is moved under the orifice traveling along the 12" length of the panel. The speed of movement of the panel should match the speed that the mastic is being pressed out of the application device so as to maintain the 0.1875" diameter. The applied bead should measure approximately 0.1875"×11.5" for each test panel. The panel should be held so that it is horizontal as the bead is being applied. After approximately 11.5" of mastic has been applied to the panel, the matrix is cut from the application device with a spatula and the panel is set aside to cool, still in the horizontal position. During the application, care must be taken to insure that the matrix bead continuously contacts the metallic panel, without bridging. If bridging occurs, it may indicate that the temperature of application should be increased. This procedure is repeated with 3 test panels for each formulation, for repeatability. Results are reported in triplicate.

Adhesion is determined by rotating the panel by 900 along the axis of the bead, so that the bead is required to support its own weight. Thus, in the test procedure, the horizontally disposed surface of the spacer, after application of the matrix, is rotated to a vertical position. A lack of adhesion, or the term not adhering, means that under the foregoing test conditions, at least a portion of the bead applied to the horizontal test panel releases from the metallic panel under the force of its own weight when the panel is rotated by 900 so that the surface is in a vertical position, as described in the foregoing.

EXAMPLES FOR DISPENSABILITY AND FOGGING TESTS

The following thermoplastic desiccating matrix formulations are dispensable and result in a matrix 132 which has substantially no adhesion to the interior of the spacer 120, and which results in no fogging of the IGU in which it is to be used. Fogging was testing by observing the heated material in a closed chamber as described in the above fogging test procedure. Adhesion was tested by the procedure set forth above.

Example 1

|  | SAMPLES | | |
| --- | --- | --- | --- |
|  | I-A (weight in g) | I-B (weight in g) | I-C (weight in g) |
| Formula Component |  |  |  |
| 3A Sieve | 100 | 100 | 100 |
| 13X Sieve | 100 | 100 | 100 |
| DP 8510 | 100 |  |  |
| ESCORENE ® UL7710 |  | 100 | 50 |
| GA 594 |  |  | 50 |
| Test Results |  |  |  |
| Pot Fog Test | NONE | NONE | NONE |
| Adhesion Test | NO | NO | NO |
| Dispensing Test | YES | YES | YES |

In the foregoing Example I, the Pot Fog Test was performed by the method described below; adhesion was tested by heating to approximately 130° C. and dispensing from a gun-type hot melt dispenser onto a stainless steel counter top and observing whether the formulation adhered upon cooling; and the dispensing test was performed in attempting to dispense the formulation for the adhesion test. The material was deemed to pass the dispensing test if it could be melted and discharged from the gun-type hot melt dispentser. DP 8510 is polybutylene from Shell Chemical Co., having a melt index of 45, when tested by ASTM D-1238, condition E. ESCORENE® UL7710 is 18% EVA. GA 594 is LLDPE.

Example 2

| | SAMPLE | | | | |
|---|---|---|---|---|---|
| | II-A (wt in g) | II-B (wt in g) | II-C (wt in g) | II-D (wt in g) | II-E (wt in g) |
| Formula Component | | | | | |
| ESCORENE ® UL7710 | 90 | 105 | 120 | 115 | 140 |
| 3A Sieve | 90 | 90 | 90 | 90 | 70 |
| 13X Sieve | 90 | 90 | 90 | 90 | 70 |
| SUNPAR ® 2280 | 30 | 15 | 0 | 5 | 0 |
| Test Results | | | | | |
| Pot Fog | Slight | Very slight | NONE | Very slight | NONE |
| Adhesion | NO | NO | NO | NO | NO |
| Dispensing | YES | YES | YES | YES | YES |

In Example 2, the viscosity of Sample II-D was 440,000 cps at 177° C. (350° F.), and of Sample II-E was 167,000 cps at 177° C. (350° F.). The tests used for Example 2 were identical to those used for Example 1.

Example 3

The formulation of sample II-E of Example 2 was repeated in a 2600 g. batch. The ESCORENE® UL 7710 was first melted in a Sigma Blade mixer. The molecular sieves were added to the mixer while operating, and the combined mixture was mixed for about 20 minutes. The viscosity of the formulation was tested in a Brookfield HBT-200 Viscometer with a Thermocell and a #29 spindle at various temperatures and RPM, yielding the following results.

| Brookfield Viscosity | | |
|---|---|---|
| Test Temperature | RPM | Viscosity, Kcps |
| Temp: 178° C. (352° F.) | 5 rpm | 193 |
| | 10 rpm | 168 |
| | 20 rpm | 170 |
| Temp: 154° C. (309° F.) | 2 rpm | 480 |
| | 5 rpm | 272 |
| | 10 rpm | 232 |
| | 20 rpm | 140 |
| Temp: 122° C. (251° F.) | 1 rpm | 2,080 |
| | 2 rpm | 1,920 |
| | 5 rpm | 1,760 |

Example 4

A further example of the present invention was prepared as follows.

| ESCORENE ® MV 02514 | 1100 g |
|---|---|
| Raven 14 Black | 1 g |
| 3A Sieve | 825 g |
| 13X Sieve | 825 g |
| TOTAL | 2751 g |

The Brookfield viscosity was tested as above with the following results:

Viscosity@177° C. (350° F.)=45,000 cps
Viscosity@121° C. (250° F.)=500,000 cps

EXAMPLE 5

A formulation was prepared containing the following ingredients:

| ethylene vinyl acetate copolymer | 49.5% by weight |
|---|---|
| molecular sieve (50:50 mixture of 3A & 13X) | 50.0% |
| carbon black | 0.5% |
| TOTAL | 100% |

In one embodiment, the ethylene vinyl acetate component has a vinyl acetate content of less than or equal to 14% by weight. In another embodiment, the ethylene vinyl acetate has a vinyl acetate content of 20% by weight. In another embodiment, the ethylene vinyl acetate component has a vinyl acetate content of about 10% to about 12% by weight. The formulation, when tested, did not adhere to a metal substrate, when applied at a temperature of 120° C., and allowed to cool, followed by testing for adhesiveness as described herein above.

EXAMPLES FOR ADHESION TESTING

The following thermoplastic desiccating matrix formulations were prepared and tested according to the above described adhesion test. In each of the following examples, the desiccant is a mixture of 50 weight % each of 3A and 13X molecular sieve.

| #6: | 14% VA Ethylene-Vinyl Acetate Copolymer (ESCORENE ® MVO 2514) | 50% |
|---|---|---|
| | Desiccant | 50% |
| #7: | 20% VA Ethylene-Vinyl Acetate Copolymer (ESCORENE ® MVO 2520) | 50% |
| | Desiccant | 50% |
| #8: | 28% VA Ethylene-Vinyl Acetate Copolymer (ESCORENE ® MVO 2528) | 50% |
| | Desiccant | 50% |
| #9: | Polybutylene (DP8510) | 50% |
| | Desiccant | 50% |
| #10: | Fatty Acid Dimer Polyamide (Henkel VERSAMID ® 757) | 50% |
| | Desiccant | 50% |

-continued

| | | |
|---|---|---|
| #11: | 14% VA Ethylene-Vinyl Acetate Copolymer (ESCORENE ® MVO 2514) | 25% |
| | Desiccant | 50% |
| | Hydrogenated Rosin Ester (Hercules FORAL ® 85) | 25% |
| #12: | 14% VA Ethylene-Vinyl Acetate Copolymer (ESCORENE ® MVO 2514) | 45% |
| | Desiccant | 50% |
| | Hydrogenated Rosin Ester (Hercules FORAL ® 85) | 5% |
| #13: | 14% VA Ethylene-Vinyl Acetate Copolymer (ESCORENE ® MVO 2514) | 15% |
| | Desiccant | 50% |
| | 121° C. (140° F.) Melt Point Hydrocarbon Paraffin Wax | 35% |

C1 Comparative Example #1: H.B. Fuller Co. INSUL-DRI® HL 5102X; this material is believed to be that described in U.S. Pat. No. 5,510,416.

Test Results

Samples 6–13 and C1 were tested according to the adhesion test described above. In all tests, the test panels were electrolytic tin plated steel test panels (T4 temper, #5 finish); application temperature was 121° C. (250° F.); each test consisted of 3 runs and in each the samples were allowed to cool to room temperature. "ADHESION LOSS" in these tests is defined as the cooled test matrix spontaneously detaching from and falling off the surface to which it was applied in the test, when the surface is rotated 900, as described above. The following results were obtained:

| FORMULA # | TEST RESULT |
|---|---|
| 6 | ADHESION LOSS (i.e., NO ADHESION) |
| 7 | ADHESION LOSS |
| 8 | NO LOSS OF ADHESION |
| 9 | ADHESION LOSS |
| 10 | ADHESION LOSS |
| 11 | NO LOSS OF ADHESION |
| 12 | ADHESION LOSS |
| 13 | ADHESION LOSS |
| C1 | NO LOSS OF ADHESION |

Curable Formulations

In one embodiment, the present invention provides a desiccating matrix formulation comprising a curable polymeric material. In one embodiment, the invention provides a desiccating matrix formulation comprising about 80 to about 30 weight % of the formulation of a curable material, wherein the curable material is selected from the group consisting of a one-part blend comprising an isocyanate-terminated prepolymer and a urethane catalyst; a two-part mixture in which a first part comprises a blend of an isocyanate-terminated prepolymer and a urethane catalyst and a second part comprises an active hydrogen compound; and a two-part mixture in which a first part comprises diglycidyl ether bisphenol A and a second part comprises an epoxy curative, for example diethylene triamine; and about 20 to about 70 weight % of the formulation of an adsorbent component, wherein the adsorbent component includes a moisture adsorbing material and a volatile organic chemical adsorbing material, of which 0–50% of the adsorbent component is the adsorbent of volatile organic compounds.

The adsorbent component may be mixed into either part of the two part curable formulations. Preferably, the adsorbent component is mixed into the first component of each of the two-part mixtures, that is, the isocyanate terminated prepolymer component or the diglycidyl ether bisphenol A component, since the first component is usually the larger.

In one embodiment, the curable material is a one-part blend comprising an isocyanate-terminated polypropylene glycol prepolymer and dibutyl tin dilaurate. In one embodiment of the one-part mixture, the isocyanate-terminated polypropylene glycol prepolymer is BAYTEC™ MP 100, available from Bayer. In this embodiment, the dibutyl tin dilaurate catalyzes the reaction of the isocyanate terminal groups with atmospheric moisture in a cross-linking reaction. In this embodiment, it is not necessary to separate the reactants into the separate components of a two-part mixture. In this embodiment, curing is initiated by moisture in the air surrounding the formulation after it has been applied. In this embodiment, the curable material is mixed with the adsorbent component prior to application.

In one embodiment, the one-part blend comprises about 100 parts by weight of an isocyanate-terminated polypropylene glycol prepolymer, about 0.5 parts by weight of dibutyl tin dilaurate and about 100 parts by weight of an adsorbent.

In one embodiment, the curable material is a two-part mixture in which a first part comprises an isocyanate-terminated prepolymer and a urethane catalyst and a second part comprises an active hydrogen compound. The second part may also comprise a urethane catalyst if needed. In one embodiment of the two-part mixture, the first part comprises as the isocyanate-terminated polypropylene glycol prepolymer, BAYTEC™ MP 100, available from Bayer. In one embodiment, the urethane catalyst is dibutyl tin dilaurate which catalyzes the reaction of the isocyanate terminal groups with the active hydrogen compound in a cross-linking reaction. The active hydrogen compound may be, for example a compound such as polypropylene glycol or 1,4 butanediol. The isocyanate-terminated prepolymer may be a relatively simple multifunctional isocyanate when the active hydrogen compound is polymeric.

Active hydrogen compounds may include alcohols, primary and secondary amines, organic acids and thiols. In one embodiment, the active hydrogen compound is 1,4-butanediol. In one embodiment, the active hydrogen compound is ethylene glycol. In one embodiment, the active hydrogen compound is 1,6-hexanediol. In one embodiment, the active hydrogen compound is ethylene diamine. In one embodiment, the active hydrogen compound is 1,4-diaminobutane. In one embodiment, the active hydrogen compound is diethylene triamine. When an amine is used, it may not be necessary to add a urethane catalyst. Similarly, when an alcohol such as 1,4-butanediol is used, it may not be necessary to add a urethane catalyst. The active hydrogen compound may be a polymeric material such as polyethylene glycol or polypropylene glycol.

The urethane catalyst may be any such catalyst known in the art. In one embodiment, the urethane catalyst is dibutyl tin dilaurate.

In one embodiment, the 1,4 butanediol initiates and participates in the polymerization reaction when the two parts are combined. In one embodiment, a first part of the two-part mixture is a blend of about 100 parts by weight of a mixture of the isocyanate-terminated polypropylene glycol prepolymer and about 100 parts by weight of an adsorbent. In one embodiment, the second part of the two-part mixture is a blend of about 10.8 parts by weight of 1,4 butanediol and about 0.5 parts by weight of dibutyl tin dilaurate.

The following examples 14 and 15 of two-part mixtures in which a first part comprises a polymeric active hydrogen compound and a urethane catalyst and a second part comprises a multifunctional isocyanate.

Example 14

Part A: 100 parts by weight PLURACOL®) 220
    100 parts by weight Desiccant 0.1 parts by weight dibutyl tin dilaurate catalyst
Part B: 6.4 parts LUPRANATE® M20S
The formulation of Example 14 contains approximately 48.4% desiccant, and is flowable at room temperature. The polymeric active hydrogen compound, PLURACOL® 220, is a polyol available from BASF, having a hydroxyl number of 27, and a molecular weight of about 6000. LUPRANATE®D M20S is a polymeric methylene diisocyanate, having a nominal functionality of 2.7, available from BASF. A plasticizer may be added to the part B component to increase the volume and thus to ease handling of the material.

Example 15

Part A: 100 parts by weight PLURACOL® TP440
100 parts by weight desiccant
0.1 part by weight dibutyl tin dilaurate catalyst
Part B: 94.9 parts by weight LUPRANATE® M20S
The formulation of Example 15 contains approximately 33.9% desiccant, and is flowable at room temperature. The polymeric active hydrogen compound, PLURACOL® TP440, is a polyol available from BASF, having a hydroxyl number of 398, and a molecular weight of about 400. LUPRANATE® M20S is a polymeric methylene diisocyanate, having a nominal functionality of 2.7, available from BASF. A plasticizer may be added to the part B component, but due to the amount of part B is not necessary for handling.

The following additional examples of two-part mixtures in which a first part comprises an isocyanate-terminated prepolymer, with no added urethane catalyst, and a second part comprises an active hydrogen compound are provided. In each case, part A comprises 100 parts by weight of BAYTEC™MP-100 and 100 parts by weight of a molecular sieve-type desiccant, and the active hydrogen compound initiates the polymerization reaction.

In each of Examples 16–19, the mixture of parts A and B is flowable, but rapidly cures to form a solid desiccating matrix which does not adhere to the surfaces spacers formed of common spacer materials, particularly aluminum, stainless steel and tin-plated steel.

In one embodiment, the curable material is a two-part mixture in which a first part comprises diglycidyl ether bisphenol A and a second part comprises an epoxy curative. In one embodiment, the epoxy curative is diethylene triamine. In one embodiment, the epoxy curative is a cycloaliphatic amine. In one embodiment, the epoxy curative is a modified aliphatic amine. In one embodiment, the epoxy curative is an amide/imidazoline. In one embodiment, the epoxy curative is an amine terminated polyoxypropylene. Any epoxy curative known in the art may be used, so long as the formulation remains flowable until it is applied. In one embodiment, the diglycidyl ether bisphenol A is EPON® 828, available from Shell Chemical Co. In one embodiment, the epoxy curative is diethylene triamine is EPON® 3223, available from Shell Chemical Co. In one embodiment, the first part of the two part mixture includes about 100 parts by weight of diglycidyl ether bisphenol A and about 100 parts by weight adsorbent, and the second part comprises about 12 parts by weight of diethylene triamine. When these two parts are mixed, the components react to form the epoxy polymer.

Additional examples of the two-part mixture in which a first part comprises diglycidyl ether bisphenol A and a second part comprises an epoxy curative are provided as follows. In each case, 100 parts by weight of the epoxy resin EPON® 828 and 100 parts by weight of a molecular sieve desiccant are combined with the following epoxy curatives:

| Example | Trade name and chemical description of active hydrogen compound | Supplier | Parts by weight active hydrogen compound | Percent by weight desiccant |
|---|---|---|---|---|
| 16 | POLAMINE ® 1000 polytetramethyleneoxide di-p-aminobenzoate | Air Products | 144 | 29.1% |
| 17 | DETDA diethylene toluene diamine | Ethyl Corp. | 21.4 | 45.2% |
| 18 | QUADROL ® N,N,N,N-tetrakis (2-hydroxypropyl) ethylene diamine | BASF | 17.5 | 46.0% |

Example 19

A further example of a two-part mixture in which a first part comprises a polymeric active hydrogen compound and a second part comprises a multifunctional isocyanate, in which the active hydrogen compound initiates the polymerization in the absence of an added urethane catalyst, is provided. Part A of the mixture contains 100 parts by weight of POLAMINE™ 1000 brand of polytetramethyleneoxide di-p-aminobenzoate and 100 parts by weight of a molecular sieve-type desiccant. Part A is mixed with a Part B which comprises 23 parts of LUPRANATE® M20S brand of polymeric methylene diisocyanate.

| Example No. | Trade name and Chemical description of epoxy curative | Supplier | Parts by weight of epoxy curative | Percent by weight desiccant |
|---|---|---|---|---|
| 20 | EPICURE ® 3382 Cycloaliphatic amine | Shell Chemical | 63 | 38.0% |
| 21 | ANCAMINE ® 163 modified aliphatic amine | Air Products | 15 | 46.5% |
| 22 | ANCAMIDE ® 500 amide/imidazoline | Air Products | 50 | 40.0% |

-continued

| Example No. | Trade name and Chemical description of epoxy curative | Supplier | Parts by weight of epoxy curative | Percent by weight desiccant |
|---|---|---|---|---|
| 23 | JEFFAMINE ® D-2 amine-terminated polyoxypropylene | Huntsman Chemical | 35 | 42.5% |

In each of Examples 20–23, the formulation was flowable immediately after mixing, and the formulation upon curing becomes a solid desiccating matrix which does not adhere to surfaces of spacers formed of common spacer materials, particularly aluminum, stainless steel and tin-plated steel.

Although the invention has been shown and described with respect to certain preferred embodiments, equivalent alterations and modifications will occur to others skilled in the art upon reading and understanding this specification and the annexed drawings. In particular regard to the various functions performed by the above described integers (components, assemblies, devices, compositions, steps, etc.), the terms (including a reference to a: means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as maybe desired and advantageous for any given or particular application.

What is claimed is:

1. A method of making a closed hollow spacer for an insulating glass unit, the method comprising:
    (1) dispensing a flowable desiccating matrix formulation onto a portion of the spacer which will be inside the spacer when the spacer has been closed;
    (2) allowing or causing the formulation to solidify into a solid matrix and to detach from any attachment to the spacer;
    (3) closing the spacer whereby the detached matrix will be retained within the spacer; and
    (4) retaining the matrix in the spacer other than by adhesion.

2. A method as in claim 1, wherein the step of dispensing includes heating the formulation to a temperature in the range from about 85° to about 200° C.

3. A method as in claim 1, wherein the step of dispensing includes heating and pumping the formulation in a hot melt pumping apparatus.

4. A method as in claim 3, wherein the step of allowing or causing the formulation to solidify includes cooling the formulation prior to the formulation coming into contact with the spacer.

5. A method as in claim 1, wherein the spacer is closed following the step of dispensing the formulation.

6. A method as in claim 1, wherein the spacer is closed prior to the step of dispensing the formulation.

7. A method as in claim 1, further including the step of assembling the insulating glass unit by joining at least one spacer and at least two panes of glass.

8. A method as in claim 7, wherein the step of assembling the insulating glass unit includes providing an adhesive material between the edge assembly and the panes of glass.

9. A method as in claim 7, wherein the step of assembling the insulating glass unit includes providing a sealing material between the edge assembly and the panes of glass.

10. A method as in claim 1, wherein the desiccating matrix formulation comprises a thermoplastic material.

11. A method as in claim 1, wherein the desiccating matrix formulation comprises a thermoplastic hot melt material.

12. A method as in claim 1, wherein the desiccating matrix formulation comprises a wax.

13. A method as in claim 1, wherein the desiccating matrix formulation comprises a tackifier.

14. A method as in claim 1, wherein the desiccating matrix formulation comprises a thermosetting material.

15. A method as in claim 1, wherein the desiccating matrix formulation comprises a two part polymerizable material.

16. A method as in claim 1, wherein the desiccating matrix formulation is in a liquid form when it is dispensed but solidifies upon contacting the spacer.

17. A method as in claim 1, wherein the desiccating matrix formulation is in a liquid form when it contacts the spacer.

18. A method as in claim 1, wherein the desiccating matrix formulation is in a liquid form when it is dispensed but solidifies prior to contacting the spacer.

19. A method as in claim 1, wherein the step of dispensing includes pumping a flowable, curable formulation.

20. A method as in claim 1, further comprising the step of freeing the matrix from any adhesion to the spacer by applying a gentle impact.

21. A method as in claim 1, wherein the matrix forms no attachment to the spacer.

22. A method as in claim 1, wherein the matrix forms an initial adhesion to the spacer and upon solidification the matrix loses the adhesion to the spacer.

23. A method as in claim 1, wherein the matrix forms an initial adhesion to the spacer and upon further handling the matrix loses the adhesion to the spacer.

24. A method of making an insulating glass unit including at least two glass panels and a hollow spacer having an interior wall and separating the glass panels to form an interior space of the IGU, the hollow spacer retaining therein a desiccating matrix, the method comprising:
    (1) heating a desiccating matrix formulation to a temperature at which it is flowable;
    (2) dispensing the formulation onto the interior wall of the hollow spacer;
    (3) allowing the formulation to solidify to form the solid matrix;
    (4) freeing the matrix from any adhesion to the spacer; and
    (5) retaining the matrix in the spacer other than by adhesion.

25. A method as in claim 24, wherein the step of dispensing includes heating the formulation to a temperature in the range from about 850 to about 200° C.

26. A method as in claim 24, wherein the step of allowing or causing the formulation to solidify includes cooling the formulation prior to the formulation coming into contact with the spacer.

27. A method as in claim 24, wherein the spacer is closed subsequent to the step of dispensing the formulation.

28. A method as in claim 24, wherein the spacer is closed prior to the step of dispensing the formulation.

29. A method as in claim 24, wherein the desiccating matrix formulation is in a liquid form when it is dispensed but solidifies upon contacting the spacer.

30. A method as in claim 24, wherein the desiccating matrix formulation is in a liquid form when it contacts the spacer.

31. A method as in claim 24, wherein the desiccating matrix formulation is in a liquid form when it is dispensed but solidifies prior to contacting the spacer.

32. A method as in claim 24, wherein the step of freeing the matrix from any adhesion to the spacer comprises applying kinetic energy by imparting a gentle impact or further handling the spacer during assembly of the insulating glass unit.

33. A method as in claim 24, wherein the step of dispensing the desiccating matrix formulation comprises pumping a curable formulation.

34. A method as in claim 24, wherein the matrix forms no attachment to the spacer.

35. A method as in claim 24, wherein the step of freeing the matrix takes place as a result of solidification of the matrix.

36. A method as in claim 24, wherein the step of freeing the matrix takes place as a result of further handling of the spacer.

37. A method of making an insulating glass unit including at least two glass panels and at least one hollow spacer separating the glass panels, the panels and spacer forming an interior space of the IGU, the hollow spacer retaining therein a solid desiccating matrix, the method comprising the steps of:
  (1) heating a desiccating matrix formulation to a temperature at which it is flowable;
  (2) dispensing the formulation into the hollow spacer under conditions such that it forms the solid matrix which does not adhere to the spacer in use; and
  (3) retaining the matrix in the spacer other than by adhesion.

* * * * *